(12) United States Patent  (10) Patent No.: US 9,444,340 B2
Tournatory  (45) Date of Patent: Sep. 13, 2016

(54) CIRCUITS AND METHODS FOR PROVIDING CURRENT TO A LOAD

(71) Applicant: GAZELLE SEMICONDUCTOR, INC., Redwood City, CA (US)

(72) Inventor: David Christian Gerard Tournatory, Redwood City, CA (US)

(73) Assignee: Gazelle Semiconductor, Inc., Sunnyvale, CA (US)

( * ) Notice: Subject to any disclaimer, the term of this patent is extended or adjusted under 35 U.S.C. 154(b) by 181 days.

(21) Appl. No.: 14/315,691

(22) Filed: Jun. 26, 2014

(65) Prior Publication Data

US 2015/0381026 A1    Dec. 31, 2015

(51) Int. Cl.
| | | |
|---|---|---|
| G05F 1/00 | (2006.01) | |
| H02M 3/158 | (2006.01) | |
| H02M 1/00 | (2006.01) | |
| H02M 3/156 | (2006.01) | |

(52) U.S. Cl.
CPC ............ H02M 3/158 (2013.01); *H02M 3/1584* (2013.01); *H02M 2001/0083* (2013.01); *H02M 2003/1566* (2013.01)

(58) Field of Classification Search
CPC ........... H02M 3/1588; H02M 3/1584; H02M 3/156; H02M 3/157; H02M 2001/007
USPC .................. 323/224, 266, 271–272, 282–285
See application file for complete search history.

(56) References Cited

U.S. PATENT DOCUMENTS

| | | |
|---|---|---|
| 4,673,889 A | 6/1987 | Cini et al. |
| 5,418,707 A | 5/1995 | Shimer et al. |
| 5,570,276 A | 10/1996 | Cuk et al. |
| 5,581,451 A | 12/1996 | Ochiai |
| 5,592,071 A | 1/1997 | Brown |
| 5,615,093 A | 3/1997 | Nalbant |
| 5,770,940 A | 6/1998 | Goder |
| 5,929,692 A | 7/1999 | Carsten |
| 6,396,137 B1 | 5/2002 | Klughart |
| 6,703,812 B1 * | 3/2004 | Lethellier ........... H02M 3/1584 323/222 |
| 6,894,464 B2 | 5/2005 | Zhang |
| 6,943,535 B1 * | 9/2005 | Schiff ................. H02M 3/1584 323/244 |
| 6,987,380 B1 | 1/2006 | Lee |
| 7,250,746 B2 | 7/2007 | Oswald et al. |

(Continued)

FOREIGN PATENT DOCUMENTS

| | | |
|---|---|---|
| EP | 1172924 A3 | 2/2002 |
| EP | 2002558 B1 | 9/2011 |

(Continued)

OTHER PUBLICATIONS

International Search Report and Written Opinion—PCT/US2014/65917—ISA/US—Feb. 11, 2015.

(Continued)

*Primary Examiner* — Nguyen Tran

(57) ABSTRACT

The present disclosure includes switching regulator circuits and methods. In one embodiment, cross coupled circuits are provided. In one embodiment, a first switching regulator stage has an output coupled to a first node, and a second switching regulator stage has an output coupled to a second node. The first switching regulator stage includes a feedback input coupled to the second node, and the second switching regulator stage includes a feedback input coupled to the first node. The first and second nodes may be coupled together through a capacitor.

18 Claims, 6 Drawing Sheets

(56) References Cited

U.S. PATENT DOCUMENTS

| | | |
|---|---|---|
| 7,432,614 B2 | 10/2008 | Ma et al. |
| 7,486,060 B1 | 2/2009 | Bennett |
| 7,499,682 B2 | 3/2009 | Rozenblit et al. |
| 7,538,535 B2 | 5/2009 | McDonald et al. |
| 7,730,340 B2 | 6/2010 | Hu et al. |
| 8,085,020 B1 | 12/2011 | Bennett |
| 8,248,152 B2 | 8/2012 | Dennard et al. |
| 2005/0007086 A1 | 1/2005 | Morimoto |
| 2005/0200404 A1 | 9/2005 | Bernardon |
| 2007/0195876 A1 | 8/2007 | Prodic |
| 2008/0197827 A1 | 8/2008 | Wrathall |
| 2011/0204862 A1 | 8/2011 | Prodic et al. |
| 2013/0200849 A1 | 8/2013 | Crebier et al. |
| 2013/0214752 A1 | 8/2013 | Tournatory |
| 2013/0214858 A1 | 8/2013 | Tournatory et al. |
| 2014/0049235 A1 | 2/2014 | Li et al. |

FOREIGN PATENT DOCUMENTS

| | | |
|---|---|---|
| EP | 2493060 A1 | 8/2012 |
| WO | 2009067591 A2 | 5/2009 |
| WO | 2011128849 A2 | 10/2011 |
| WO | 2013122782 A1 | 8/2013 |

OTHER PUBLICATIONS

Josh Wibben et al, "A High-Efficiency DC-DC Converter Using 2 nH Integrated Inductors", IEEE Journal of Solid-State Circuits, Jul. 7, 2007, pp. 844-854, vol. 43, No. 4.

International Search Report (from a corresponding foreign application), PCT/US2014/45812, mailed Dec. 5, 2014.

International Search Report (from a corresponding foreign application), PCT/US2013/078355, mailed Apr. 8, 2014.

* cited by examiner

CIRCUITS AND METHODS FOR PROVIDING CURRENT TO A LOAD

BACKGROUND

The present disclosure relates to switching regulator circuits and methods.

Regulator circuits are used to provide voltage and current in a wide variety of applications. One type of regulator circuit is a switching regulator. Switching regulators typically include switching circuits that selectively couple voltage and current to an inductor. Energy is stored in the inductor and then translated to different voltage and current levels according to system needs. For example, one example switching regulator (e.g., a "Buck" regulator or "down converter") may receive 10 volts and 1 ampere ("amp") of current from a power supply and generate 1 volt at approximately 10 amps.

Systems on a Chip (SoCs), processors (e.g., CPUs and GPUs), memories, and other complex digital information processing systems are sometimes composed of several voltage domains, such as V_Core(s), V_DDR, V_Serdes, V_Memory, etc. Providing power to these different voltage domains can be challenging because of the strict requirements of these systems, such as limitations on voltage variation and current load and load step requirements, for example. Powering up these voltage domains with independent voltage regulators featuring a high slew capability present several advantages. First, it allows optimization of the voltage of each power domain according to the power need of a particular power domain at any given point of time. Having voltage regulators with fast slew capabilities presents the advantage of tracking the workload of each power domain in real time or quasi real time, therefore keeping supply voltage always near a minimum and significantly reducing power consumption. It also allows the power domains to be fully powered down independently without relying on inefficient headers or power switches in the SoCs, CPUs or GPUs, for example.

In some applications it may also be advantageous to integrate one or more voltage regulators inside a digital integrated circuit (IC) package to reduce the system integration complexity at board level, reduce the number of inputs and outputs (IOs), and/or reduce the input current of a digital IC. However, integration of a voltage regulator inside a package is challenging because of the limited space inside the package. Building an efficient and effective regulator that can fit inside a package and meet the stringent requirements that are often associated with complex digital ICs remains a challenge. The industry needs fast, highly efficient, and very small footprint voltage regulators that can be integrated in the package of modern SoCs, CPUs, GPUs, and other digital ICs.

Therefore, it would be advantageous to overcome the limitations of existing switching regulator technology.

SUMMARY

The present disclosure includes switching regulator circuits and methods. In one embodiment, cross coupled circuits are provided. In one embodiment, a first switching regulator stage has an output coupled to a first node, and a second switching regulator stage has an output coupled to a second node. The first switching regulator stage includes a feedback input coupled to the second node, and the second switching regulator stage includes a feedback input coupled to the first node. The first and second nodes may be coupled together through a capacitor.

The following detailed description and accompanying drawings provide a better understanding of the nature and advantages of the present disclosure.

DETAILED DESCRIPTION

The present disclosure pertains to circuits and methods for providing current to a load. In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
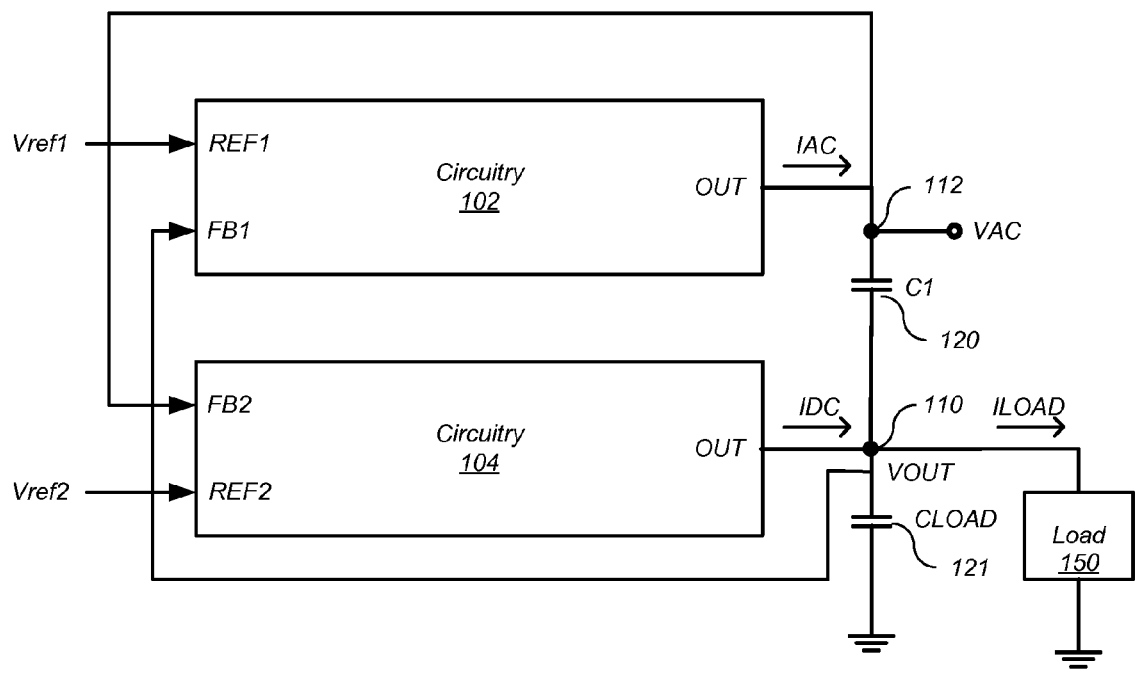
FIG. 1 illustrates a circuit according to one embodiment.

Embodiments of the present disclosure include circuit techniques that may drive current to or from a node very fast. FIG. 1 illustrates a circuit according to one embodiment. In certain applications, it may be desirable to change load current, ILOAD, in a load 150 or the voltage, VOUT, on the load very quickly. Embodiments of the present disclosure include first circuitry 102 and second circuitry 104 that work together to produce fast changes in the load current ILOAD, for example. As described in more detail below, circuitry 102 and 104 may be two switching regulator stages.

In this example, an output of circuitry 102 is coupled to node 112 on one side of a capacitor 120. Node 112 is coupled to a node 110 and load 150 through capacitor 120. Circuitry 104 includes an output coupled to node 110 and load 150. Circuitry 102 is configured to control the voltage on node 110, VOUT, and circuitry 104 is configured to control the voltage on node 112, VAC. Advantageously, the speed of circuitry 102 may be faster than the speed of circuitry 104, creating a fast feedback loop from the output node 110 through circuitry 102 and capacitor 120 to node 110 and a slow feedback loop from node 112 through circuitry 104 and capacitor 120 to node 112. Circuitry 102 may have a wider small signal bandwidth and/or a faster clock frequency (e.g., switching frequency) than circuitry 104, for example, so that circuitry 102 responds faster than circuitry 104.

The configurations of circuits 102 and 104 operate to maintain a voltage VOUT on node 110 and a voltage VAC on node 112 at particular voltage values. For instance, circuitry 102 may receive a reference voltage, Vref1, and a feedback signal, FB1. Similarly, circuitry 104 may receive a reference voltage, Vref2, and a feedback signal, FB2. Features and advantages of the present disclosure include sensing, by circuit 102, a voltage VOUT on node 110 coupled to load 150 and sensing, by circuit 104, a voltage VAC on node 112. Circuit 102 may provide a first current IAC to load 150 through capacitor 120 over a first time period to maintain VOUT at a particular voltage value. Circuit 104 may change a second current IDC to load 150 over a second time period in response to a change in VAC to maintain VAC at a particular voltage value. Advantageously, circuitry 102 may be faster than circuitry 104 such that the first time period is less than the second time period. Accordingly, circuitry 102 provides fast AC current IAC to the load 150 through capacitor 120 in response to changes VOUT, for example, and circuitry 104 changes current IDC in responses to changes in VAC to bring VAC back to a nominal value.

Figure 2:
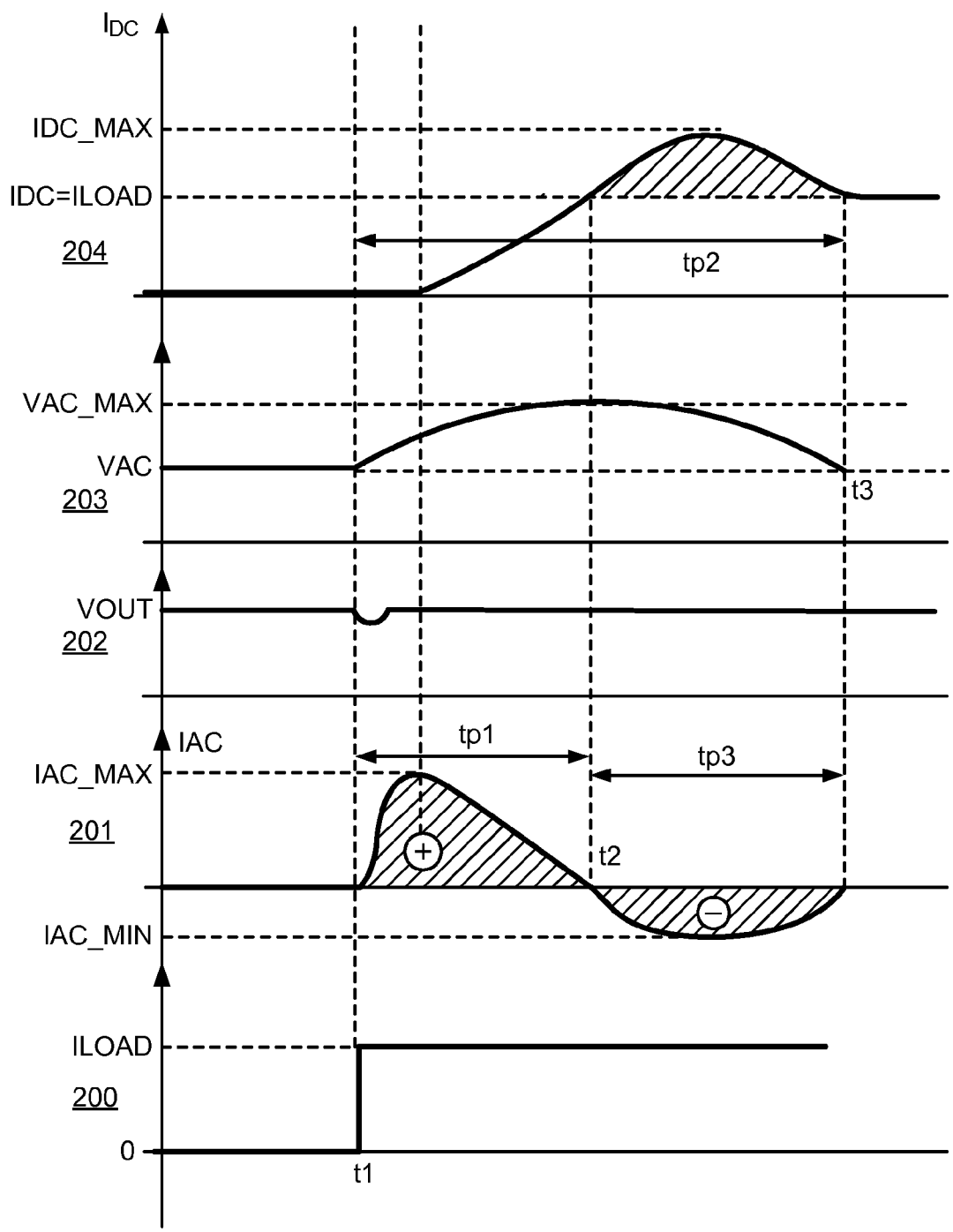
FIG. 2 shows example plots of currents and voltages responding to a change in loading according to one embodiment.
Figure 3:
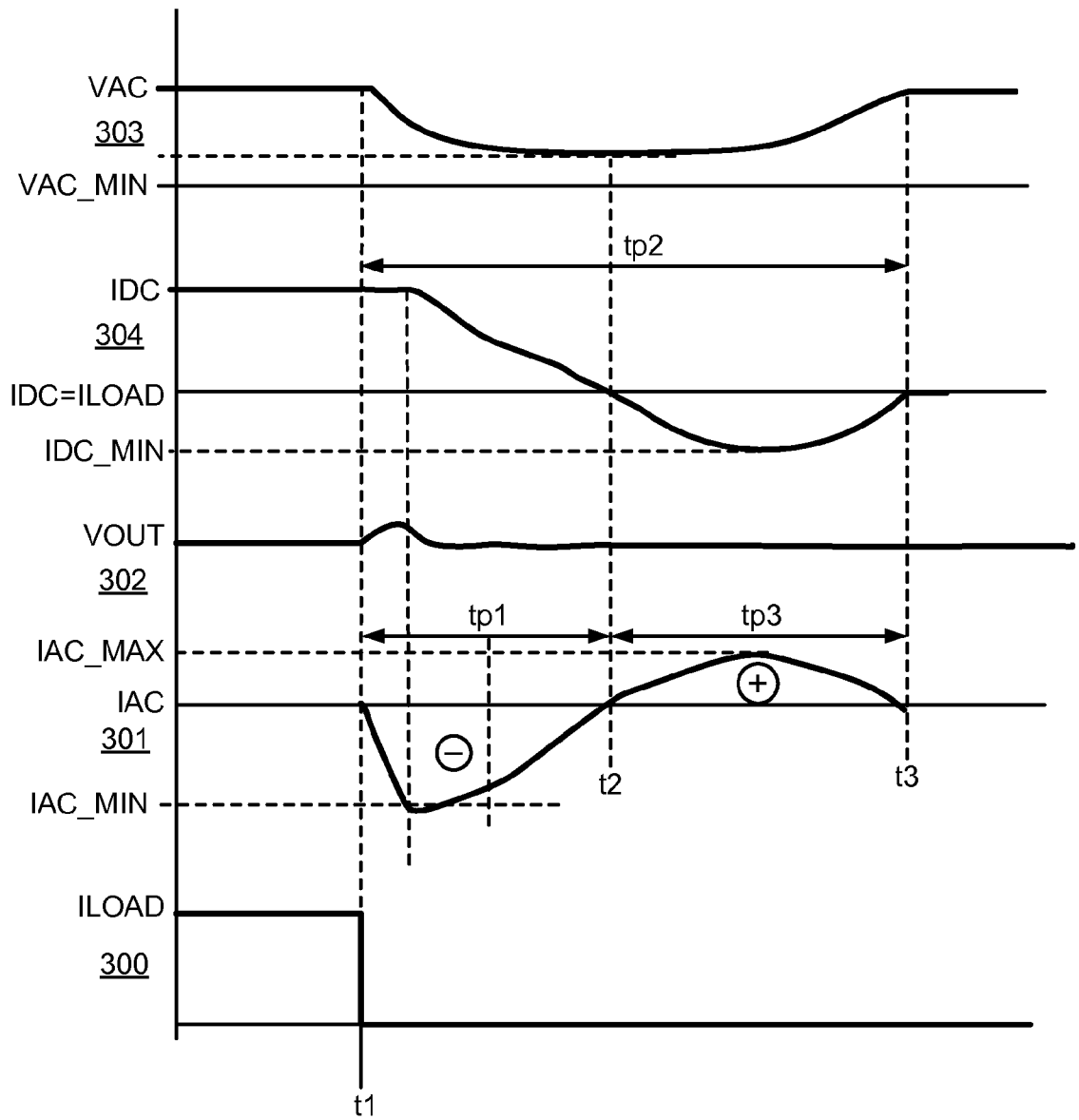
FIG. 3 shows example plots of currents and voltages responding to a change in loading according to another embodiment.

The current delivery capability of a circuit according to one example embodiment is further illustrated by the plots shown in FIGS. 2-3. In these example plots, a load current ILOAD is increased in a current step (e.g., at 200 in FIG. 2). While the present examples are illustrated in terms of load current step, it is to be understood that the principles of the present disclosure are applicable to programming fast voltage steps in a fast dynamic voltage frequency scaling (DVFS) application, where V=I*Rload.

FIG. 2 shows example plots of currents and voltages responding to a change in loading according to one embodiment. A positive current step in ILOAD occurs at time t1 as shown at 200 in FIG. 2. An increase in ILOAD may initially cause a drop in VOUT at node 110 in FIG. 1, for example, as illustrated at 202 in FIG. 2. A drop in VOUT may be sensed by a fast feedback loop (e.g., circuitry 102) to quickly increase current IAC through capacitor 120 and into node 110 as shown at 201 in FIG. 2. IAC is initially zero at time t1 and IAC increases in magnitude (here, positive) to a maximum value, IAC_MAX, corresponding to a change in the load current. In this example, IAC increases quickly to match ILOAD (e.g., IAC_MAX=ILOAD). However, the AC current through capacitor 120 causes the voltage on node 112 VAC to increase as charge is stored on capacitor 120, which is illustrated at 203. A slow feedback loop (e.g., circuitry 104) senses the change in VAC and begins to increase the current IDC into node 110 as illustrated at 204. The fast feedback loop acts to reduce current IAC as current IDC is increased so that a sum of IDC and IAC is approximately equal to ILOAD (e.g., IDC+IAC=ILOAD and VOUT=Constant). Therefore, over a first time period, tp1, IAC is increased quickly and then reduced back to zero when IDC is increased to ILOAD.

Because changes in IDC are generated by the slow feedback loop, IDC will increase much more slowly than IAC. Accordingly, as shown at 201 and 204 in FIG. 2, IDC changes over a longer time period tp2 than IAC. Initially, around time t1, current IDC is changed from an initial value (here, zero) to a current value matching the new load current over the first time period, tp1. The point where IAC returns to zero, at time t2, is the point where IDC has increased to match ILOAD.

However, as illustrated at 203, VAC has been driven to a new voltage VAC_MAX, which is sensed by the slow feedback loop to produce further increases in IDC. Therefore, IDC continues to increase to a higher current value IDC_MAX. The fast feedback loop senses VOUT and provides a current IAC to the load through the capacitor 120 of FIG. 1, for example, of opposite polarity to the previous IAC current over a third time period tp3 to cancel the excess IDC current. This opposite polarity IAC current removes charge on the capacitor and restores VAC to a nominal VAC voltage value. As shown at 201 in FIG. 2, IAC is initially zero, and then decreases in magnitude to a value equal to a difference between ILOAD and IDC (here, IAC_MIN). As charge is removed from the capacitor, the magnitude of IAC decreases back to zero. Accordingly, because the combination of IDC and IAC approximately equals ILOAD, the increase of IDC above ILOAD causes IAC to change polarity (in this case negative). Over time period tp3, IDC is greater than ILOAD, and a difference between the IDC and ILOAD causes IAC to remove charge from capacitor 120 and restore the VAC to a nominal (e.g., regulated) voltage value.

FIG. 3 shows example plots of currents and voltages responding to a change in loading according to another embodiment. In this example, the polarities of the currents are reversed compared with FIG. 2. For example, in this case, a negative current step in ILOAD occurs at time t1 as shown at 300 in FIG. 3. A decrease in ILOAD may initially cause an increase in VOUT at node 110 in FIG. 1, for example, as illustrated at 302 in FIG. 3. An increase in VOUT may be sensed by a fast feedback loop (e.g., circuitry 102) to quickly increase current IAC through capacitor 120 and out of node 110 as shown at 301 in FIG. 3. In this case, the magnitude of the current may be the same, but of opposite polarity than shown in FIG. 2 (e.g., IAC is negative). Similarly, IAC is initially zero at time t1 and IAC increases in magnitude (here, negative) to a maximum value, IAC_MIN, corresponding to the negative change in the load current. In this example, IAC increases quickly in the negative direction to match ILOAD (e.g., ILOAD=-IAC_MIN). However, the AC current through capacitor 120 causes the voltage on node 112 VAC to decrease as charge in depleted from the capacitor 120, which is illustrated at 303. A slow feedback loop (e.g., circuitry 104) senses the change in VAC and begins to change the current IDC in the negative direction out of node 110 as illustrated at 304. The fast feedback loop acts to reduce the magnitude of current IAC as current IDC is decreased so that a sum of IDC and IAC is approximately equal to ILOAD (here, zero). Therefore, over a first time period, tp1, IAC is increased in magnitude quickly and then reduced back to zero when IDC is decreased to ILOAD.

As for a positive current step, because changes in IDC are generated by the slow feedback loop, IDC will decrease much more slowly than IAC. Accordingly, as shown at 301 and 304 in FIG. 3, IDC changes over a longer time period tp2 than IAC. Initially, around time t1, current IDC is changed from an initial value (here, ILOAD) to a current value matching the new load current (here, zero) over the first time period, tp1. The point where IAC returns to zero, at time t2, is the point where IDC has increased to match ILOAD.

However, as illustrated at 303, VAC has been driven to a new voltage VAC_MIN, which is sensed by the slow feedback loop to produce further decreases in IDC. Therefore, IDC continues to decrease to a lower current value IDC_MIN. Fast feedback loop senses VOUT and provides a current IAC to the load through the capacitor 120 of FIG. 1, for example, of opposite polarity to the previous IAC current (here, positive) over a third time period tp3 to cancel the excess IDC current. This opposite polarity IAC current charges the capacitor and restores VAC to a nominal VAC voltage value. As shown at 301 in FIG. 3, IAC is zero at time t2, and then increases in magnitude to a maximum value equal to a difference between ILOAD and IDC (here, IAC_MAX). As the capacitor is charged, and VAC increases, the magnitude of IAC decreases back to zero at time t3. Accordingly, because the combination of IDC and IAC approximately equals ILOAD, the decrease of IDC below ILOAD causes IAC to change polarity (in this case positive). Over time period tp3, IDC is less than ILOAD, and a difference between the IDC and ILOAD causes the IAC to charge capacitor 120 and restore the VAC to a nominal (e.g., regulated) voltage value.

Figure 4:
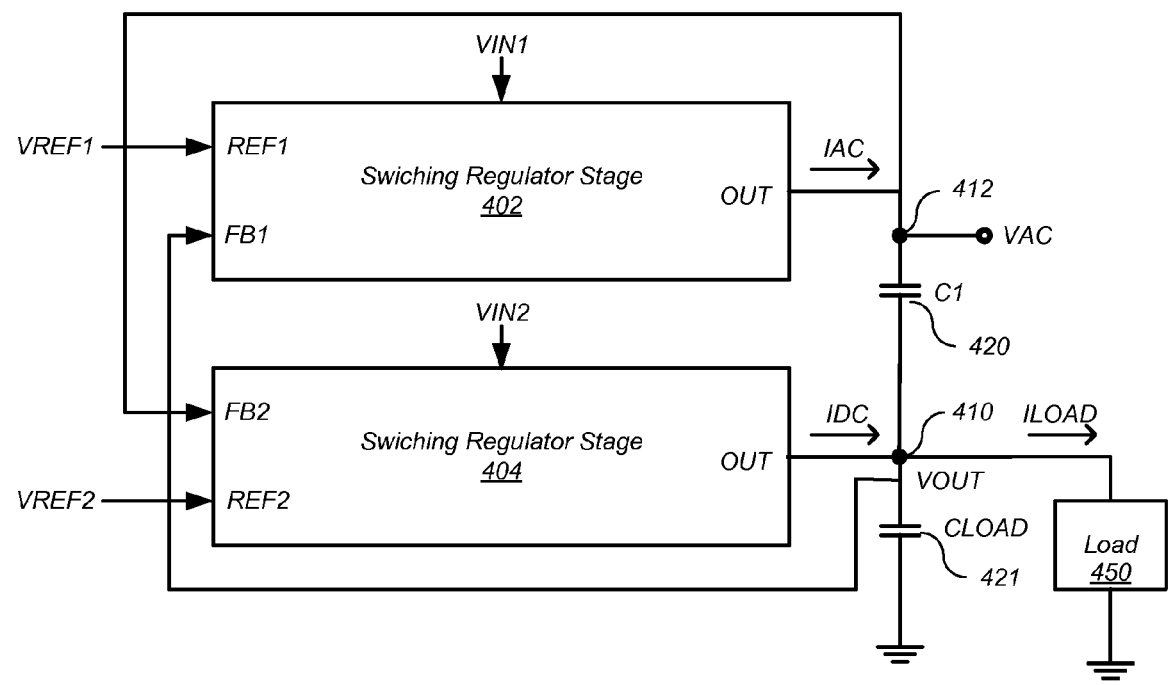
FIG. 4 illustrates an example switching regulator according to another embodiment.

FIG. 4 illustrates an example switching regulator according to one embodiment. In this example, a first switching regulator stage 402 receives a first input voltage VIN1 and a reference voltage REF1 and produces an output current IAC. A second switching regulator stage 404 receives a second input voltage VIN2 and a reference voltage REF2 and produces an output current IDC. VIN1 and VIN2 may be the same voltage, such as a supply voltage Vdd, but in other embodiments VIN1 and VIN2 may be coupled to different supply voltages. For example, in some embodiments VIN1 may be less than VIN2, which allows use of lower breakdown devices (e.g., FETs) in the high frequency AC stage to improve efficiency. An output of stage 402 is coupled to node 412 having a voltage VAC, and an output of stage 404 is coupled to node 410 having a voltage VOUT. Nodes 410 and 412 are coupled together through capacitor (C1) 420. A load 450 may be coupled to an output of the composite regulator to receive a regulated output voltage VOUT on node 410. VOUT may be stored across a load capacitor, CLOAD 421, for example. In this example, switching regulator stages 402 and 404 receive cross coupled feedback, where the feedback input, FB1, of stage 402 is coupled to the output of stage 404 at node 410 to regulate VOUT and the feedback input, FB2, of stage 404 is coupled to the output of stage 402 at node 412 to regulate VAC.

Stage 402 acts to regulate the voltage VOUT through capacitor 420. For example, if VOUT drops below VREF1 (e.g., due to an increase in load current), stage 402 increases the IAC current, which flows through capacitor 420 into node 410 to increase VOUT to approximately equal VREF1. Similarly, if VOUT increases above VREF1 (e.g., due to a decrease in load current), stage 402 decreases the IAC current through capacitor 420 into node 410 to reduce VOUT to approximately equal VREF1.

Voltage VAC at node 412 is regulated by stage 404 interacting with stage 402. For example, if VAC increases above VREF2 (e.g., due to an increase in the voltage across capacitor C1), stage 404 increases the IDC current. Increasing IDC, in turn, causes stage 402 to reduce IAC so that ILOAD remains constant. As illustrated in FIGS. 2 and 3, the change in IDC increases until VAC is approximately equal VREF2. Thus, VAC causes IDC to increase above ILOAD so that IAC changes polarity and sinks current out of capacitor 420 to return VAC to VREF2. Similarly, if VAC decreases below VREF2 (e.g., due to a decrease in the voltage across capacitor C1), stage 404 decreases the IDC current until stage 402 increases IAC to increase VAC back to VREF2.

As mentioned above, stage 402 may operate at a higher speed than stage 404. For example, stage 402 may have a higher loop bandwidth and faster switching frequencies than stage 404. Stage 404 may be designed for lower bandwidth and lower switching frequencies. Accordingly, stage 402 can provide a fast AC current to the load, and stage 404 slowly takes over providing DC current from the output of stage 404 into a load.

Figure 5:
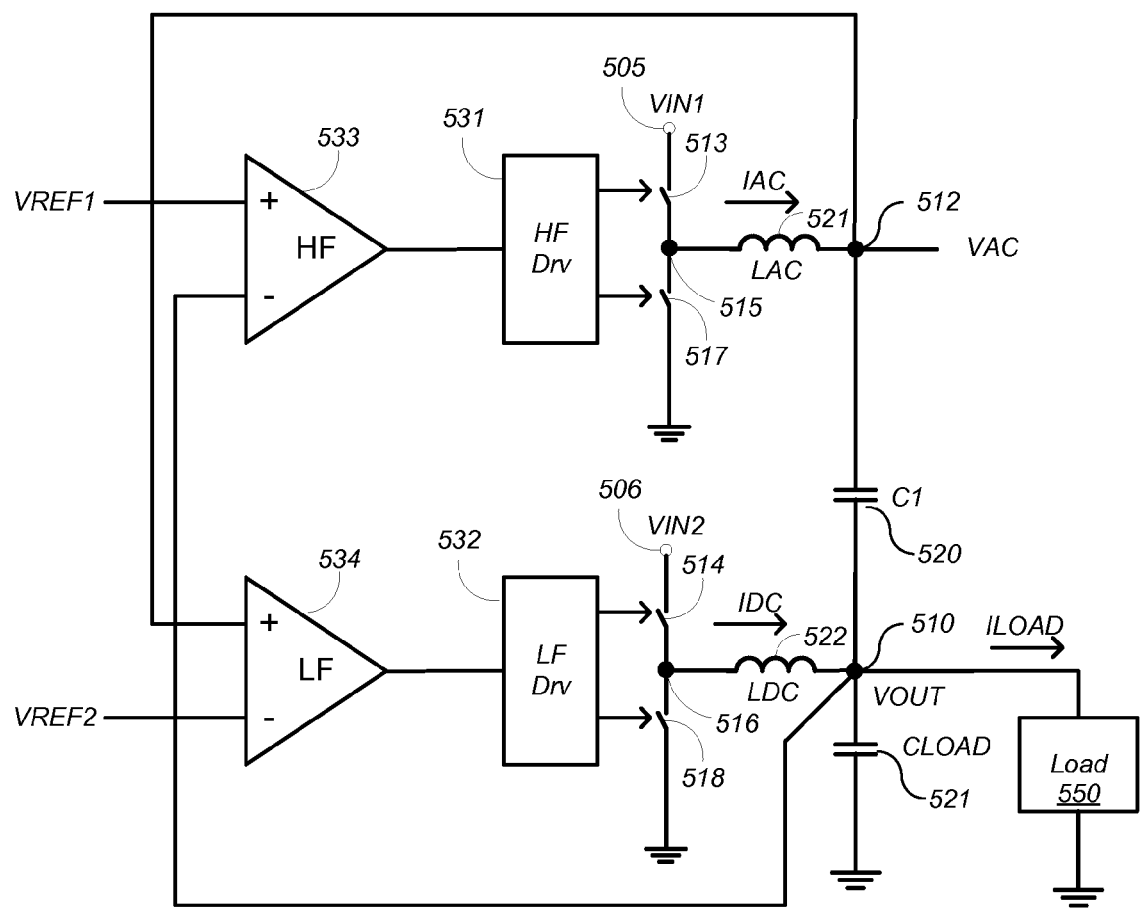
FIG. 5 illustrates an example switching regulator according to another embodiment.

FIG. 5 illustrates an example switching regulator according to another embodiment. A composite switching regulator as shown in this example may be used to provide a regulated voltage VOUT and varying load current ILOAD to a load 550. In this example, a fast AC stage may include a first switch (high side switch) 513 having a first terminal coupled to a first input voltage VIN1 505 and a second terminal coupled to a switching node 515. A second switch (low side switch) 517 includes a first terminal coupled to switching node 515 and a second terminal coupled to a reference voltage, such as ground. A first inductor LAC 521 includes a first terminal coupled to switching node 515 and a second terminal coupled to node 512. Switches 513 and 517 are opened and closed by signals received from a high frequency driver circuit (HF DRV) 531. The signals from driver 531 may be voltages transitioning between a high voltage state and a low voltage state at a particular switching frequency, for example. For some implementations of switches as NMOS transistors, a high voltage state may turn the switch ON, thereby shorting the terminals of the switch, and a low voltage state may turn the switch OFF, thereby disconnecting the terminals of the switch. However, it is to be understood that a variety of other implementations of switches may be used, including other types of transistors and other polarities of signals to turn the switches ON and OFF.

An input of driver circuit 531 is coupled to an output of a high frequency (HF) comparison circuit 533 that compares a reference voltage VREF1 to the voltage on node 510, VOUT. If VOUT drops below VREF1, comparison circuit 533 signals driver circuit 531 to increase IAC by closing high side switch 513 for a longer period of time each switching cycle, for example. If VOUT increases above VREF1, comparison circuit 533 signals driver circuit 531 to decrease IAC by closing low side switch 517 for a longer period of time each switching cycle, for example.

Similarly, a slower DC stage may include a first switch (high side switch) 514 having a first terminal coupled to a first input voltage VIN2 506 and a second terminal coupled to a switching node 516. A second switch (low side switch) 518 includes a first terminal coupled to switching node 516 and a second terminal coupled to a reference voltage, such as ground. A second inductor LDC 522 includes a first terminal coupled to switching node 516 and a second terminal coupled to node 510. Switches 514 and 518 are opened and closed by signals received from a low frequency driver circuit (LF DRV) 532. The signals from driver 532 may be voltages transitioning between a high voltage state and a low voltage state at a particular switching frequency lower than the switching frequency of HF driver circuit 531, for example.

An input of driver circuit 532 is coupled to an output of a low frequency (LF) comparison circuit 534 that compares a reference voltage VREF2 to the voltage on node 512, VAC. If VAC drops below VREF2, comparison circuit 534 signals driver circuit 532 to decrease IDC by closing low side switch 518 for a longer period of time each switching cycle, for example. If VAC increases above VREF2, comparison circuit 534 signals driver circuit 532 to increase IDC by closing high side switch 514 for a longer period of time each switching cycle, for example.

As mentioned above, the architecture illustrated in FIG. 5 may be used to provide a regulated voltage VOUT to load 550 that can respond quickly to changing load conditions. VOUT is stored across capacitor COUT 521. The two switching regulator stages work together to maintain the current into COUT 521 as close to zero as possible so that the output voltage VOUT remains constant. The architecture illustrated in FIG. 5 operates as shown in FIGS. 2 and 3 to positive and negative load current steps. In other embodiments, the reference voltages may be changed rapidly to quickly change the output voltage VOUT in a fast DVFS application, the operation of which is analogous to a load current step where current is driving into the load to change VOUT.

Figure 6:
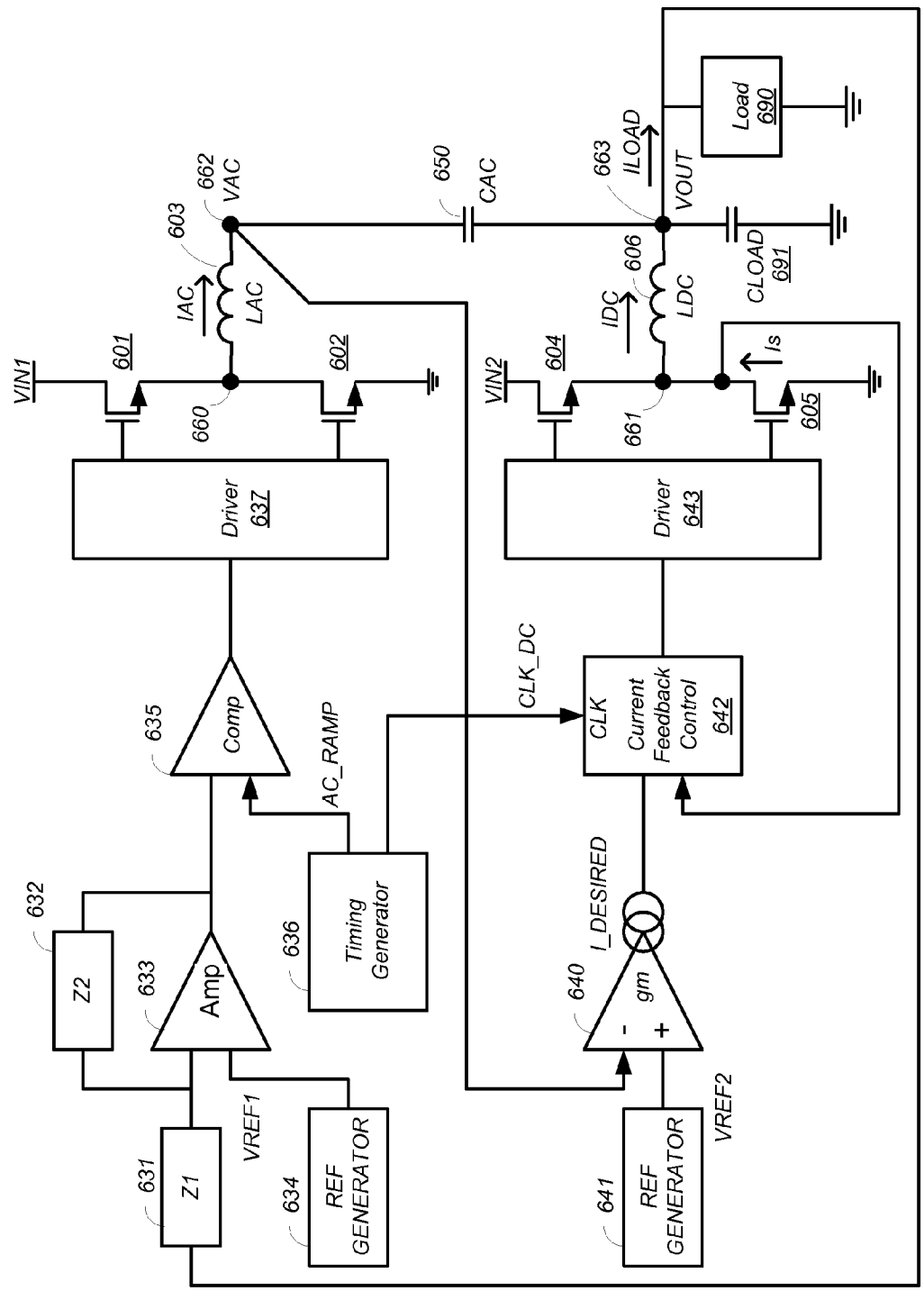
FIG. 6 illustrates an example switching regulator according to another embodiment.

FIG. 6 illustrates another example of a switching regulator circuit according to one embodiment. A first regulator stage (the AC stage) includes switching transistors 601-602, inductor 603, and associated control and driver circuits 631-637. MOS transistor 601 (acting as a high side switch) has a drain coupled to a first power supply voltage VIN1, a source coupled to a switching node 660, and a gate coupled to driver circuit 637 to receive signals to turn transistor 601 ON and OFF. Similarly, MOS transistor 602 (acting as a low side switch) has a drain coupled to the switching node 660, a source coupled to a reference voltage (e.g., ground), and a gate coupled to driver circuit 637 to receive signals to turn transistor 602 ON and OFF. A first terminal of inductor 603 LAC is coupled to the switching node 660 and a second terminal is coupled to an output node 662 of the switching regulator stage having a voltage VAC.

A second regulator stage (the DC stage) includes switching transistors 604-605, inductor 606, and associated control and driver circuits 640-643. MOS transistor 604 (acting as a high side switch) has a drain coupled to a second power supply voltage VIN2, a source coupled to a switching node 661, and a gate coupled to driver circuit 643 to receive signals to turn transistor 604 ON and OFF. Similarly, MOS transistor 605 (acting as a low side switch) has a drain coupled to the switching node 661, a source coupled to a reference voltage (e.g., ground), and a gate coupled to driver circuit 643 to receive signals to turn transistor 605 ON and OFF. A first terminal of inductor 606 LDC is coupled to the switching node 661 and a second terminal is coupled to an output node 663 of the switching regulator stage having a voltage VOUT.

In this example, the output voltage VOUT on output node 663 is coupled to the input of control circuits associated with the AC stage. In this example, AC stage control circuits include a first impedance circuit 631 having an input coupled to VOUT and an output coupled to a terminal of amplifier 633. A second impedance circuit 632 has an input coupled to an output of amplifier 633 and an output coupled to the input of amplifier 633. A second input of amplifier 633 receives a reference voltage (e.g., VREF1) from reference generator 634. In one embodiment, reference generator 634 may be programmable to change VREF1 on command, for example, and thereby change VOUT. An output of amplifier 633 is coupled to one input of comparator 635. A second input of comparator 635 is coupled to a timing generator 636 to receive a modulated sawtooth, AC_RAMP, having high and low frequency components. Examples and further disclosure of timing generator 636 and ripple cancellation are disclosed in commonly owned concurrently filed U.S. patent application Ser. No. 14/315,682, entitled "SWITCHING REGULATOR CIRCUITS AND METHODS," naming David Christian Gerard Tournatory and Nicolas Stephane Monier as inventors, the content of which is hereby incorporated herein by reference for all purposes. The output of comparator 635 is a PWM signal. The PWM signal is coupled to driver 637 to control the switches 601 and 602. By operation of the loop, switches 601 and 602 will adjust VOUT to be equal to the voltage produced by reference generator 634 (e.g., VREF1).

The output voltage VAC at node 662 is coupled to the input of control circuits associated with the DC stage. DC stage control circuits include a transconductance amplifier ("gm") 640 that receives VAC and a reference voltage VREF2 from reference generator 641. Amplifier 640 compares VAC to VREF2 and outputs a current I_DESIRED, which corresponds to a desired current at the DC stage output to result in VAC being equal to VREF2. I_DESIRED is provided to a current feedback circuit 642 together with a sensed output current, Is, and a DC stage clock, CLK_DC from timing generator 636. CLK_DC may be a integer fraction (1/M) of the high frequency component of the AC_RAMP signal mentioned above so that the switching frequency of driver 637 and transistors 601 and 602 in the AC stage is an integer multiple of the switching frequency of driver 643 and transistors 604 and 605 in the DC stage to cancel ripple at the output node 663. Sensed output current, Is, may be sensed when transistor 605 is turned ON, for example, and when the inductor current IDC is equal to the current through transistor 605. Output current, Is, may be detected as a voltage drop across transistor 605 and used to control driver circuit 643 and switches 604 and 605. Output current sensing and an example feedback control circuit are disclosed in commonly owned concurrently filed U.S. patent application Ser. No. 14/315,672, entitled "Switching Regulator Current Mode Feedback Circuits and Methods," naming David Christian Gerard Tournatory, the content of which is hereby incorporated herein by reference for all purposes.

Integration in Package

One advantageous application of certain embodiments of the present disclosure is integration of a regulator into a package. Traditionally, integrated circuits sometimes require multiple power supply voltages to operate. In some cases, an integrated circuit (IC) package may therefore have multiple different power supply inputs at different voltages to connect external regulators with each of the different power supply terminals on the IC package. However, features and advantages of the present disclosure may facilitate integration of one or more regulators inside the package. Integration of a regulator inside a package according to certain embodiments described herein is also advantageous because an integrated voltage regulator may reduce the amount of current flowing through an IC package connection (e.g., such as a solder ball). Integration of a switching regulator inside a package may allow higher voltages, at lower corresponding currents for a particular power level, to be brought inside the IC package. Internal switching regulators in the package may translate the higher voltages down to lower voltages and higher currents to provide lower voltage higher current power supplies to integrated circuits in the package. Multiple different voltages may be generated inside a package by multiple integrated switching regulators, for example, thereby reducing pin count on the package and reducing the current flow, and corresponding resistive losses, through package pins.

Package Integration Via Reduced Ripple

One challenge faced when integrating a switching regulator onto a package pertains to the size of external components used by the switching regulator (e.g., inductors and capacitors). For example, a buck switching converter operating at 5 MHz may require a very large inductor and capacitor to meet an output voltage ripple specification of +/−30 mV. To meet a stringent output voltage ripple specification, the inductance is typically increased to reduce the current slew rate and thereby reduce current ripple. Moreover, current ripple drives charge onto the switching regulator's output capacitor, causing a voltage ripple given by Vripple=Q/C. Thus, the output capacitance is also typically increased to reduce voltage ripple to meet power supply voltage specifications. These large inductances and capacitances render typical switching regulators impractical for integration onto a package. To reduce component sizes, the switching frequency of the switching regulator may be increased, but increases in the switching frequency reduce the efficiency of the switching regulator resulting from losses caused by the increased charge and discharge of internal capacitances and other factors.

For comparison purposes, one example implementation of a switching regulator according to the present disclosure, such as shown in FIGS. 5 and 6, may include the following component sizes: LDC=36 nH, LAC=23 nH, CAC/C1=4.7 uF, and COUT/CLOAD=4.7 uF, where Vout=0.6 v, VAC= 5 v, Vin=10 v, Freq_DC=5 MHz, and Freq_AC=30 MHz.

Small component sizes are achieved without the typical loss in efficiency because the DC path is operating at lower frequency and very high efficiency, thereby providing a high efficiency switching regulator that may be integrated into a package.

An independent reference voltage on the DC stage allows setting the output voltage on the AC stage, VAC, at any value. For example, the AC stage output voltage may be set at VAC=½VIN, where the slew rates become symmetrical, thereby allowing ripple cancellation at lower frequencies in the DC stage than if a typical non-symmetric 2 phase Buck switching regulator were used.

The above description illustrates various embodiments along with examples of how aspects of the embodiments may be implemented. The above examples and embodiments should not be deemed to be the only embodiments, and are presented to illustrate the flexibility and advantages of the various embodiments as defined by the following claims. Based on the above disclosure and the following claims, other arrangements, embodiments, implementations and equivalents will be evident to those skilled in the art and may be employed without departing from the spirit and scope of the embodiments as defined by the claims.

What is claimed is:

1. A method, comprising:
sensing, by a first circuit, a first voltage on a first node coupled to a load, wherein the first circuit comprises an output coupled to a second node, and the second node is coupled to the first node through a first capacitor;
sensing, by a second circuit, a second voltage on the second node, wherein the second circuit comprises an output coupled to the first node;
providing a first current to the load by the first circuit through the first capacitor over a first time period to maintain the first voltage at a first voltage value;
changing a second current to the load by the second circuit over a second time period in response to a change in the second voltage to maintain the second voltage at a second voltage value, wherein the first time period is less than the second time period; and
providing a third current to the load by the first circuit through the first capacitor of opposite polarity to the first current over a third time period to remove charge on the first capacitor and restore the second voltage to the second voltage value, wherein the third current is initially zero, and providing the third current comprises increasing the magnitude of the third current to a maximum value equal to a difference between the load current and the second current, and decreasing the magnitude of the first current to zero.

2. The method of claim 1, wherein the first current is produced through a first inductor at the output of the first circuit and the second current is produced through a second inductor at the output of the second circuit.

3. The method of claim 1, wherein the first circuit operates at a higher speed than the second circuit.

4. The method of claim 1, wherein a sum of the first current and second current are approximately equal to a load current.

5. The method of claim 1, wherein changing a second current comprises:
changing the second current to a first current value over the first time period, the first current value matching a load current; and
changing the second current to a second current value, wherein a difference between the second current value and the load current causes the first current to restore the second voltage to the second voltage value; and
changing the second current to the first current value matching the load current.

6. The method of claim 1, wherein the first current is initially zero, and providing the first current comprising:
increasing the magnitude of the first current in a first polarity to a maximum value corresponding to a change in the magnitude of a load current; and
decreasing the magnitude of the first current in the first polarity to zero.

7. The method of claim 1, wherein the third time period overlaps a terminal portion of the second time period.

8. The method of claim 1, wherein the first time period overlaps an initial portion of the second time period.

9. The method of claim 1, wherein the first circuit is a first switching regulator stage and the second circuit is a second switching regulator stage.

10. The method of claim 1, wherein the first voltage is on a first terminal of the first capacitor and the second voltage is on a second terminal of the first capacitor, and wherein the first circuit regulates the first voltage at the first voltage value and the second circuit regulates the second voltage at the second voltage value.

11. The method of claim 1, wherein said change in the second voltage is caused by said providing the first current to the load by the first circuit through the first capacitor.

12. The method claim 1, wherein the first current is provided to the load by the first circuit over a first time period in response to a change in a load current.

13. The method claim 1, wherein the first current is provided to the load by the first circuit over a first time period in response to a change in a programmed output voltage.

14. A circuit, comprising:
a first switching regulator stage having a first input to sense a first voltage on a first node coupled to a load, a second input coupled to receive a first supply voltage, and an output coupled to a second node, wherein the second node is coupled to the first node through a first capacitor; and
a second switching regulator stage having a first input to sense a second voltage on the second node, a second input coupled to receive a second supply voltage, and an output coupled to the first node,
wherein the first switching regulator stage provides a first current to the load through the first capacitor over a first time period to maintain the first voltage at a first voltage value,
wherein the second switching regulator stage changes a second current to the load over a second time period in response to a change in the second voltage to maintain the second voltage at a second voltage value, wherein the first time period is less than the second time period, and wherein the first switching regulator stage provides a third current to the load through the first capacitor of opposite polarity to the first current over a third time period to remove charge on the first capacitor and restore the second voltage to the second voltage value, wherein the third current is initially zero, the third current being provided by increasing the magnitude of the third current to a maximum value equal to a difference between the load current and the second current, and decreasing the magnitude of the first current to zero.

15. The circuit of claim 14, wherein the first current is produced through a first inductor at the output of the first switching regulator stage and the second current is produced through a second inductor at the output of the second switching regulator stage.

16. The circuit of claim 14, wherein the first switching regulator stage comprises:
 a first switch having a first terminal coupled to the first supply voltage and a second terminal coupled to a first switching node;
 a second switch having a first terminal coupled to the first switching node and a second terminal coupled to ground; and
 a first inductor having a first terminal coupled to the first switching node and a second terminal coupled to a first terminal of the first capacitor at the second node,
 and wherein the second switching regulator stage comprises:
 a third switch having a first terminal coupled to the second supply voltage and a second terminal coupled to a second switching node;
 a fourth switch having a first terminal coupled to the second switching node and a second terminal coupled to ground; and
 a second inductor having a first terminal coupled to the second switching node and a second terminal coupled to a second terminal of the first capacitor at the first node.

17. The circuit of claim 16, wherein the first switching regulator stage further comprises a first driver circuit, and wherein the second regulator stage comprises a second driver circuit, wherein the first driver circuit operates the first switch and the second switch at a higher frequency than the second driver circuit operates the third switch and the fourth switch.

18. A circuit comprising:
 means for sensing a first voltage on a first node coupled to a load, wherein the first circuit comprises an output coupled to a second node, and the second node is coupled to the first node through a first capacitor;
 means for sensing a second voltage on the second node, wherein the second circuit comprises an output coupled to the first node;
 means for providing a first current to the load by the first circuit through the first capacitor over a first time period to maintain the first voltage at a first voltage value; and
 means for changing a second current to the load by the second circuit over a second time period in response to a change in the second voltage to maintain the second voltage at a second voltage value, wherein the first time period is less than the second time period; and
 means for providing a third current to the load through the first capacitor of opposite polarity to the first current over a third time period to remove charge on the first capacitor and restore the second voltage to the second voltage value, wherein the third current is initially zero, and the providing the third current comprises increasing the magnitude of the third current to a maximum value equal to a difference between the load current and the second current, and decreasing the magnitude of the first current to zero.

\* \* \* \* \*